(12) United States Patent
Anschutz et al.

(10) Patent No.: US 7,620,026 B2
(45) Date of Patent: Nov. 17, 2009

(54) METHODS, SYSTEMS, AND COMPUTER PROGRAM PRODUCTS FOR PROVIDING ADVERTISING AND/OR INFORMATION SERVICES OVER MOBILE AD HOC COOPERATIVE NETWORKS USING ELECTRONIC BILLBOARDS AND RELATED DEVICES

(75) Inventors: Thomas Arnold Anschutz, Conyers, GA (US); Mounire El Houmaidi, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 350 days.

(21) Appl. No.: 11/548,845

(22) Filed: Oct. 12, 2006

(65) Prior Publication Data

US 2008/0089288 A1    Apr. 17, 2008

(51) Int. Cl.
*H04W 4/00*    (2009.01)
(52) U.S. Cl. .................................... 370/338; 370/332
(58) Field of Classification Search .................. 370/331
See application file for complete search history.

(56) References Cited

U.S. PATENT DOCUMENTS

| | | | | |
|---|---|---|---|---|
| 5,214,793 | A * | 5/1993 | Conway et al. | 455/500 |
| 6,490,519 | B1 * | 12/2002 | Lapidot et al. | 701/117 |
| 6,615,130 | B2 * | 9/2003 | Myr | 701/117 |
| 6,731,940 | B1 * | 5/2004 | Nagendran | 455/456.1 |
| 7,003,288 | B2 * | 2/2006 | Ueda et al. | 455/418 |
| 7,103,368 | B2 * | 9/2006 | Teshima | 455/456.3 |
| 2002/0055906 | A1 * | 5/2002 | Katz et al. | 705/39 |
| 2002/0122003 | A1 * | 9/2002 | Patwari et al. | 342/450 |
| 2003/0063015 | A1 * | 4/2003 | Ebner et al. | 340/907 |
| 2003/0078062 | A1 * | 4/2003 | Burr | 455/562 |
| 2003/0203741 | A1 * | 10/2003 | Matsuo et al. | 455/519 |
| 2004/0073361 | A1 * | 4/2004 | Tzamaloukas et al. | 701/210 |
| 2004/0143540 | A1 * | 7/2004 | Song | 705/37 |
| 2004/0203797 | A1 | 10/2004 | Burr | |
| 2005/0039136 | A1 * | 2/2005 | Othmer | 715/774 |
| 2005/0053007 | A1 | 3/2005 | Bernhardt et al. | |
| 2005/0174975 | A1 * | 8/2005 | Mgrdechian et al. | 370/338 |
| 2005/0266852 | A1 * | 12/2005 | Kitamura | 455/437 |
| 2006/0068822 | A1 | 3/2006 | Kalhan | |
| 2006/0092939 | A1 | 5/2006 | Duggi et al. | |
| 2006/0114851 | A1 | 6/2006 | Gupta et al. | |
| 2007/0061057 | A1 * | 3/2007 | Huang et al. | 701/23 |

\* cited by examiner

*Primary Examiner*—Lester Kincaid
*Assistant Examiner*—Yu (Andy) Gu
(74) *Attorney, Agent, or Firm*—Myers Bigel Sibley & Sajovec, P.C.

(57) ABSTRACT

A method of operating an electronic billboard includes detecting a mobile electronic device within a predetermined distance of the electronic billboard, establishing an ad hoc wireless connection with the mobile electronic device, and transmitting location-specific data to the mobile electronic device over the ad hoc wireless connection. The location-specific data is associated with a geographic location of the electronic billboard. For example, the location-specific data may include advertising content, traffic and/or construction conditions, emergency information, and/or tourism information associated with the geographic location of the electronic billboard. Related methods, devices, and computer program products are also discussed.

16 Claims, 6 Drawing Sheets

METHODS, SYSTEMS, AND COMPUTER PROGRAM PRODUCTS FOR PROVIDING ADVERTISING AND/OR INFORMATION SERVICES OVER MOBILE AD HOC COOPERATIVE NETWORKS USING ELECTRONIC BILLBOARDS AND RELATED DEVICES

FIELD OF THE INVENTION

The present invention relates to communications networks, and more particularly, to providing advertising and/or information services over communication networks.

BACKGROUND OF THE INVENTION

Advertising may significantly influence consumer purchases. As such, businesses may rely on advertisements to attract or maintain consumers who purchase their products. Effective advertising may involve strategic placement of billboards and other displays that may be visible to consumers. For example, large billboards may be strategically placed alongside highways and/or major roads. The billboards may display advertisements that reinforce brand recognition and/or identify the location and/or availability of certain goods and products. Advertisements may also be displayed on mobile structures such as trucks, vans, buses, and taxis.

Timing and location may play an important role in the effectiveness of advertising. For example, effective advertising may require dynamic changes in response to economic effects, social pressures, world events, product supply, consumer demand, and many other factors. Typical advertising displays, however, may not be adaptive to accommodate such changes. Billboards, for instance, may require time and/or manpower in order to replace outdated advertising. Kiosks at shopping centers may also require manpower and/or time to replace the displayed advertising. Moreover, the time and/or manpower that may be required to change an advertising scheme may be significant if an advertiser uses multiple advertising resources. Accordingly, there may be a significant lag between the recognition of when an advertisement should be displayed and the time it is actually displayed to consumers.

SUMMARY OF THE INVENTION

According to some embodiments of the present invention, a method of operating an electronic billboard includes detecting a mobile electronic device within a predetermined distance of the electronic billboard, establishing an ad hoc wireless connection with the mobile electronic device, and transmitting location-specific data to the mobile electronic device over the ad hoc wireless connection. The location-specific data is associated with a geographic location of the electronic billboard.

In some embodiments, a signal may be received from the mobile electronic device, and a traveling vector for the mobile electronic device may be determined based on the signal. For example, the traveling vector may be determined based on changes in a received signal strength of the signal, changes in perceived frequency and/or wavelength of the signal, and/or using a directional antenna array. The ad hoc wireless connection may be established based on the traveling vector.

In other embodiments, the location-specific data may include advertising content, current traffic conditions, road construction conditions, local area information updates, emergency information, and/or tourism information associated with the location of the electronic billboard.

In some embodiments, the location-specific data may be advertising content. Pricing information included in the advertising content may be dynamically altered based on real-time supply and demand conditions at a business establishment associated with the advertising content.

In other embodiments, the location-specific data may be an offer for locally available goods and/or services. An acceptance and/or counteroffer may be received from the mobile electronic device over the ad hoc wireless connection responsive to transmission of the offer. In addition, identification information associated with the mobile electronic device, such as payment information, may be received over the ad hoc wireless connection.

In some embodiments, user and/or device information may be received from the mobile electronic device over the ad hoc wireless connection. The location-specific data may include targeted advertising content based on the received user and/or device information, and may be transmitted to the mobile electronic device over the ad hoc wireless connection responsive to receiving the user and/or device operating information. In addition, pricing information associated with the targeted advertising may be dynamically altered based on the received user and/or device information. Also, displayed location-specific data may be updated responsive to receiving the user and/or device information.

In other embodiments, vehicular information may be received from a plurality of mobile electronic devices within the predetermined distance of the electronic billboard over a respective plurality of ad hoc wireless connections thereto. Traffic data may be generated based on the received vehicular information, and may be transmitted to the mobile electronic device over the ad hoc wireless connection.

In some embodiments, user and/or device information may be received from a plurality of mobile electronic devices that pass within the predetermined distance of the electronic billboard over a respective plurality of ad hoc wireless connections thereto. The user and/or device information may be stored in a database. In addition, the received user and/or device information may be transmitted to an interested party via a wired and/or wireless connection thereto.

In other embodiments, device identification information may be received from the mobile electronic device over the ad hoc wireless connection. Information indicating a presence of the mobile electronic device within the predetermined distance of the electronic billboard may be provided to a fixed network access point responsive to receiving the device identification information.

According to other embodiments of the present invention, a method for operating a mobile electronic device includes detecting an electronic billboard within a predetermined distance of the mobile electronic device, establishing an ad hoc wireless connection with the electronic billboard, receiving location-specific data from the electronic billboard over the ad hoc wireless connection, and displaying the location-specific data. The location-specific data is associated with a geographic location of the electronic billboard.

In some embodiments, a user selection may be received indicating desire to travel to a location associated with the displayed advertising content, and distance and/or directions to the may be computed responsive to the user selection.

In other embodiments, the location-specific data may be displayed on a monitor associated with the mobile electronic device. In addition, the location-specific data may be integrated with currently displayed content on the mobile electronic device.

In some embodiments, the location-specific data may be associated with a specific video layer. The location-specific data may be integrated by providing the location-specific data as a text and/or image overlay on at least a portion of the currently displayed content.

In other embodiments, the location-specific data may be location-specific advertising data, and the currently displayed content may include other advertising data that is tagged with metadata. The location-specific data may be integrated by replacing the other advertising data in the currently displayed content with the location-specific advertising data based on the metadata.

In some embodiments, the location-specific data may be an offer for locally available goods and/or services. An acceptance and/or counteroffer may be transmitted to the electronic billboard over the ad hoc wireless connection responsive to receiving the offer.

In other embodiments, user and/or device information may be transmitted to the electronic billboard over the ad hoc wireless connection. The user and/or device information may be monitored, for example, via a user interface. The location-specific data may include targeted advertising based on the transmitted user and/or device information, and may be received from the electronic billboard responsive to transmitting the user and/or device information.

In some embodiments, vehicular information associated with the mobile electronic device may be transmitted to the electronic billboard over the ad hoc wireless connection. The location-specific data may include traffic data based on the transmitted vehicular information, and may be received from the electronic billboard responsive to transmitting the vehicular information.

In other embodiments, a database stored in the mobile electronic device may be updated with the location-specific data responsive to receiving the location-specific data.

In some embodiments, a second ad hoc wireless connection may be established with at least one other mobile electronic device within a predetermined distance of the mobile electronic device, and the received location-specific data may be relayed to the at least one other mobile electronic device over the second ad hoc wireless connection.

Other methods, systems, devices, and/or computer program products according to other embodiments of the invention will become apparent to one with skill in the art upon review of the following drawings and detailed description. It is intended that all such additional methods, systems, devices, and/or computer program products be included within this description, be within the scope of the present invention, and be protected by the accompanying claims.

DETAILED DESCRIPTION OF EMBODIMENTS OF THE INVENTION

Figure 1:
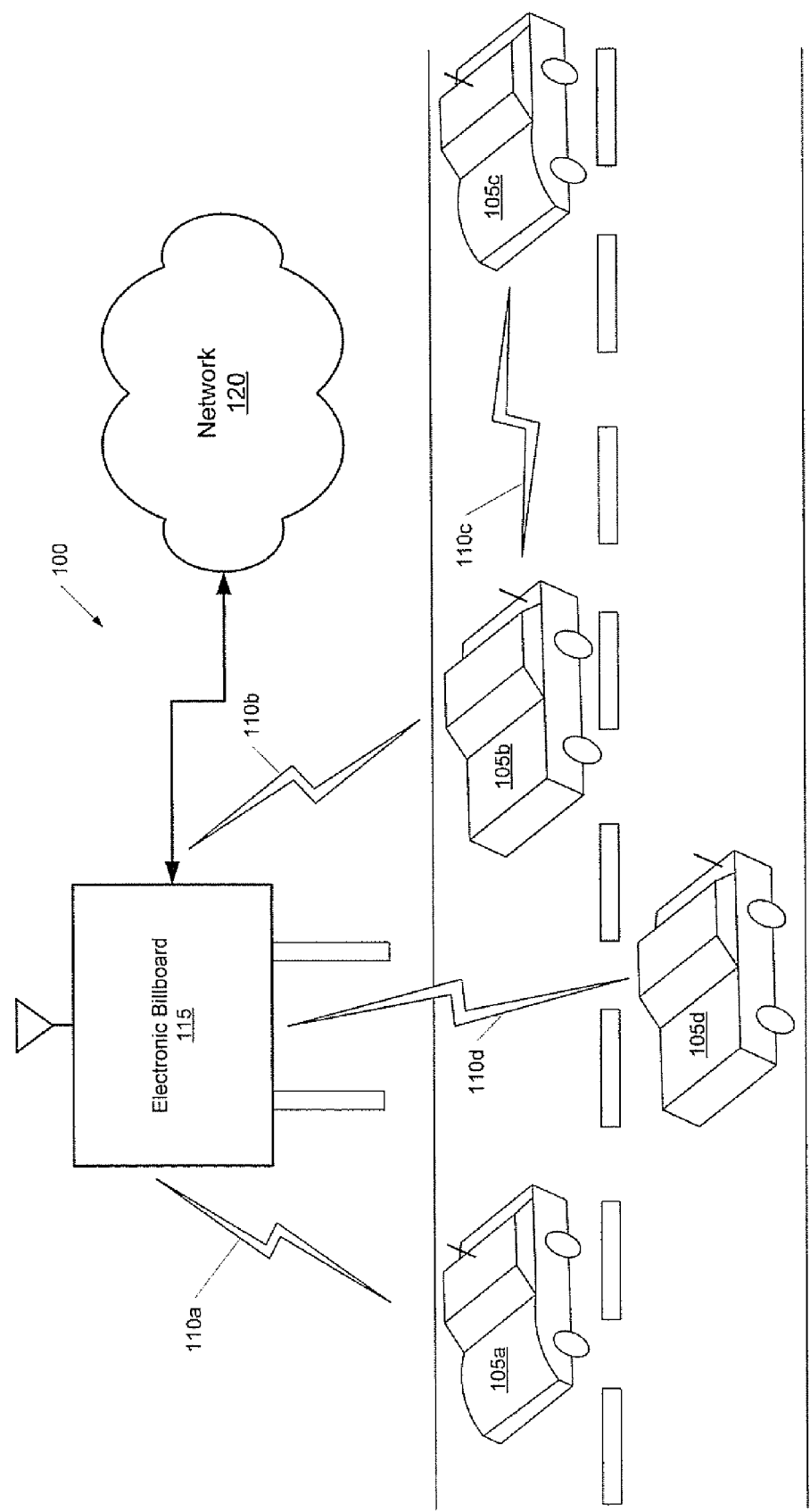
FIG. 1 is a block diagram illustrating a mobile ad hoc cooperative communication system for providing advertising and/or information services and related devices according to some embodiments of the present invention.

Specific exemplary embodiments of the invention will now be described with reference to the accompanying drawings. This invention may, however, be embodied in many different forms and should not be construed as limited to the embodiments set forth therein. Rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first mobile electronic device could be termed a second mobile electronic device, and, similarly, a second mobile electronic device could be termed a first mobile electronic device without departing from the teachings of the disclosure.

The present invention is described hereinafter with reference to flowchart and/or block diagram illustrations of systems, methods, and computer program products in accordance with some embodiments of the invention. These flowchart and/or block diagrams further illustrate exemplary operations of the system and device architectures of FIGS. 1 to 6. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: a portable computer diskette, a random access memory (RAM), a read-only memory (ROM), an erasable programmable read-only memory (EPROM or Flash memory), and a compact disc read-only memory (CD-ROM).

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Computer program code for carrying out operations of systems, methods, and computer program products according to some embodiments of the present invention discussed below may be written in a high level programming language, such as C or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

As used herein, the term "mobile electronic device" may include any device that is capable of receiving and displaying audio and/or video content, and may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; a notebook or laptop computer that includes a modem or other network transceiver; and/or a vehicle integrated with and/or otherwise associated with such a mobile electronic device.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and the relevant art, and will not be interpreted in an idealized or overly formal sense unless expressly so defined herein.

FIG. 1 illustrates a mobile ad hoc cooperative communication system for providing advertising and/or information services and related devices and methods according to some embodiments of the present invention. Referring now to FIG. 1, a mobile ad hoc cooperative communication system 100 includes a plurality of mobile electronic devices, such as automobiles 105a-105d, and an electronic billboard 115 configured to transmit location-specific data, such as advertising and/or information services, to one or more of the plurality of mobile electronic devices over respective ad hoc wireless connections 110a-110d. As used herein, the term "electronic billboard" may refer to any fixed and/or mobile device which may be configured to wirelessly transmit advertising and/or other location-specific information content. As such, the electronic billboard 115 may be incorporated into a conventional billboard and/or a mobile billboard for advertising local goods and/or services. In addition, the electronic billboard 115 may be incorporated into kiosks, signs, traffic lights, road construction barrels, and the like.

The electronic billboard 115 may also be coupled to a network 120. The network 120 may represent a global network, such as the Internet, or other publicly accessible network. The network 120 may also, however, represent a wide area network, a local area network, an Intranet, or other private network, which may not be accessible by the general public. Furthermore, the network 120 may represent a combination of one or more wired and/or wireless public and/or private networks and/or virtual private networks (VPN). Accordingly, in some embodiments, the electronic billboard 115 may receive location-specific data and/or updates thereto from local businesses, organizations, and the like over the network 120. The location-specific data may be stored locally at the electronic billboard 115 and/or may be stored at one or more devices connected to the electronic billboard 115 via the network 120.

The electronic billboard 115 and the automobiles 105a-105d of FIG. 1 may each include a wireless local area network interface transceiver that supports formation of one or more ad hoc wireless connections, such as the ad hoc wireless connections 110a-110d. The wireless local area network interface transceiver, for example, may be provided according to a Wi-Fi standard and/or a Bluetooth standard. In addition, the electronic billboard 115 and/or one or more of the automobiles 105a-105d may include an infrared (IR) transceiver configured to establish the ad hoc wireless connections 110a-110d using infrared couplings. To reduce signal interference that may occur in data transmission between the electronic billboard 115 and the automobiles 105a-105d, the ad hoc wireless connections 110a-110d may be established using different frequencies, directional antenna arrays, and/or spread-spectrum techniques, such as spread-spectrum frequency hopping. Such techniques are well-known in the art, and as such, will not be discussed further herein.

As shown in FIG. 1, the electronic billboard 115 may be configured to detect one or more mobile electronic devices, such as the automobiles 105a-105d, within a predetermined distance of the electronic billboard 115. More particularly, as illustrated in FIG. 1, the electronic billboard 115 may detect automobiles 105a, 105b, and 105d within the transmission range of the electronic billboard 115. For example, the electronic billboard 115 may detect and/or discover the automobiles 105a, 105b, and 105d based on respective signals received from one or more of the automobiles 105a, 105b, and 105d using discovery techniques that are well-known in the art. Similarly, the automobiles 105a, 105b, and 105d may detect the electronic billboard 115 based on signals broadcast from the electronic billboard 115. Accordingly, the ad hoc wireless connections 110a, 110b, and 110d may be established between the detected automobiles 105a, 105b, and 105d and the electronic billboard 115.

In some embodiments, the electronic billboard 115 may determine traveling vectors based on the respective signals provided by the detected automobiles 105a, 105b, and 105d, and may selectively establish the ad hoc wireless connections 110a, 110b, and 110d based on the determined traveling vectors. For example, the electronic billboard 115 may determine the traveling vectors based on changes in received signal strength of the respective signals, changes in perceived frequency and/or wavelength of the signals (i.e., Doppler shift principles), using a directional antenna array, and/or using other techniques. The traveling vectors may indicate the speed, distance, direction of movement, and/or positions for one or more of the detected automobiles 105a, 105b, and 105d relative to the electronic billboard 115. For instance, one traveling vector may indicate that the automobile 105b is approaching the electronic billboard 115 from a distance of about one mile at a speed of about 60 miles per hour, while another traveling vector may indicate that the automobile 105a is traveling away from the electronic billboard 115 and has already passed a location associated with location-specific data to be transmitted by the electronic billboard 115. As such, the electronic billboard may establish the ad hoc wireless connection 110b with the approaching automobile 110b, but may not establish the ad hoc wireless connection 110a with the automobile 105a, based on the determined traveling vectors.

Still referring to FIG. 1, the electronic billboard 115 is configured to transmit location-specific data associated with a geographic location of the electronic billboard 115 for receipt by appropriately-enabled mobile electronic devices. More particularly, as shown in FIG. 1, the electronic billboard 115 may transmit the location-specific data to the automobiles 105a, 105b, and 105d over the established ad hoc wireless connections 110a, 110b, and 110d, respectively. For example, the location-specific data may include advertising content for food, gas, lodging, and/or other goods and/or services that are available within a predetermined vicinity of the electronic billboard 115. The location-specific data may also include tourism information associated with the geographic location of the electronic billboard 115. In addition, the location-specific data may include local-area information updates for a mobile electronic device database, such as a vehicle navigation systems. For instance, the information updates may include current information regarding streets and/or local businesses in the geographic area of the electronic billboard 115 to update the navigation systems of one or more of the automobiles 105a-105d. The location-specific data may further include current traffic and/or road construction conditions within a predetermined distance of the electronic billboard 115, and/or emergency information, such as severe weather updates, for geographic locations near the electronic billboard 115.

For example, the electronic billboard 115 may receive advertising content for a local business via the network 120, and may thereby transmit the advertising content for the local business to one or more mobile electronic devices passing within the transmission range of the electronic billboard 115, such as the automobiles 105a, 105b, and 105d. In addition, the electronic billboard 115 may dynamically update portions of the advertising content, such as pricing information, based on real-time supply and demand conditions at the local business associated with the advertising content. For instance, during a busy lunch hour, a local restaurant may provide pricing data for an $8.99 lunch special to the electronic billboard 115 via the network 120 for transmission to the automobiles 105a, 105b, and 105d over the ad hoc wireless connections 110a, 110b, and 110d, respectively. However, at 3:00 p.m., the local restaurant may provide pricing data for a reduced-price $5.99 lunch special to the electronic billboard 115 via the network 120, to reflect real-time changes in demand.

In addition, the electronic billboard 115 may be configured to receive an acceptance and/or counteroffer from one or more mobile electronic devices within the transmission range of the electronic billboard 115, such as the automobiles 105a, 105b, and/or 105d, based on the transmitted advertising content. For example, a local hotel may provide an offer for reduced-rate lodging to the electronic billboard 115 over the network 120 based on current availability, and the electronic billboard 115 may transmit the offer to the automobiles 105a, 105b, and 105d via the ad hoc wireless connections 110a, 110b, and 110d, respectively. Responsive to receiving the offer, the automobiles 105a, 105b, and 105d may display the offer to one or more passengers of the automobile, for example, in a dashboard mounted monitor. The automobile 105a may transmit an acceptance of the offer to the electronic billboard 115 via the ad hoc wireless connections 110a, and the electronic billboard 115 may relay the acceptance of the offer to the local hotel via the network 120. In addition, automobile 105b may decline the offer, while automobile 105d may transmit a counteroffer to the electronic billboard 115 via the ad hoc wireless connection 110d. As such, the electronic billboard 115 may relay the counteroffer to the local hotel via the network 120, and if the hotel accepts, the electronic billboard 115 may transmit the acceptance of the counteroffer to the automobile 105d via the ad hoc wireless connection 110d.

In the above example, the electronic billboard 115 may be further configured to receive identification information for use in scheduling reservations at the hotel for the automobiles 105a and 105d via the ad hoc wireless connections 110a and 110d, respectively. The identification information received from the automobiles 105a and/or 105d may be an anonymous identifier, similar to a chosen screen name, and/or a non-anonymous identifier, which may specifically identify the automobiles 105a and/or 105d, and/or a specific passenger thereof. In addition, the acceptance and/or identification information received from the automobiles 105a and/or 105d may include payment, scheduling preferences, and/or other details relating to the purchase of the goods and/or services specified in the offer transmitted by the electronic billboard 115.

The electronic billboard 115 may also be configured to transmit particular location-specific data based on the information received from one or more mobile electronic devices. More particularly, as shown in FIG. 1, the electronic billboard 115 may receive user and/or device information from the automobiles 105a, 105b, and 105d over the ad hoc wireless connections 110a, 110b, and 110d, respectively, and may transmit targeted advertising content that is based on the received user and/or device information to the automobiles 105a, 105b, and 105d over the respective ad hoc wireless connections 110a, 110b, and 110d. For example, the automobile 105a may transmit remaining fuel information to the electronic billboard 115 via the ad hoc wireless connection 110a, the automobile 105b may transmit current tire pressure information to the electronic billboard 115 via ad hoc wireless connection 110b, and the automobile 105d may transmit driver alertness and/or drowsiness information (for example, as determined by an in-car camera) to the electronic billboard 115 via the ad hoc wireless connection 1101*d*. Based on this received information, the electronic billboard 115 may transmit an advertisement for a local gas station to the automobiles 105*a* and 105*b* via the ad hoc wireless connections 110*a* and 110*b*, respectively, and may transmit an advertisement for a local coffee shop to the automobile 105*d* via the ad hoc wireless connection 110*d*.

The electronic billboard 115 may be further configured to dynamically alter pricing information associated with the targeted advertising based on the received user and/or device operating information from the automobiles 105*a*, 105*b*, and 105*d*. For example, the electronic billboard 115 may learn that automobile 105*a* has less than a gallon of remaining fuel based on the device operating information received therefrom, and may determine that there is only one local gas station within 10 miles of the location of the electronic billboard 115. As such, the electronic billboard 115 may transmit an advertisement for the local gas station including increased gas prices to automobile 105*a* via the ad hoc wireless connection 110*a*.

In some embodiments where the electronic billboard 115 includes and/or is otherwise associated with a traditional billboard and/or display, the electronic billboard 115 may be configured to update location-specific data shown on the display based on the user and/or device information received from one or more of the automobiles 105*a*-105*d*. For example, responsive to receiving device information indicating that automobile 105*h* is powered by a diesel engine, the electronic billboard 115 may display prices for diesel fuel at a local gas station as the automobile 105*b* approaches the display. Similarly, upon receiving device information indicating that the automobiles 105*c* and 105*d* require premium fuel, the electronic billboard 115 may display prices for premium fuel at a local gas station via the display.

In addition, the electronic billboard 115 may be configured to store the received user and/or device information in a database and/or provide the information to an interested party via the network 120, for example, for use in market research. For instance, information such as the make and model of the automobile, the number of passengers in the automobile, and/or other data may be received from one or more of the automobiles 105*a*-105*d* traveling within the transmission range of the electronic billboard 115. Such information may be provided to interested parties for use in determining types of businesses that may be successful in areas surrounding the geographic location of the electronic billboard 115.

The electronic billboard 115 may also be configured to receive vehicular information, such as speed, braking, and/or accident data, from the automobiles 105*a*, 105*b*, and 105*d* within the transmission range of the electronic billboard 115. As such, the electronic billboard 115 may generate traffic data based on the received vehicular information. For example, the electronic billboard 115 may receive current speed data from each of the automobiles 105*a*, 105*b*, and 105*d* over the ad hoc wireless connections 110*a*, 110*b*, and 110*d*, and may compute an average speed of the automobiles 105*a*, 105*b*, and 105*d* based on the received speed data. The electronic billboard 115 may thereby transmit traffic data including the average speed data to the automobiles 105*a*, 105*b*, and 105*d* and/or other automobiles within the transmission range of the electronic billboard 115 via respective ad hoc wireless connections to indicate that traffic is slowing and/or stopped ahead. In addition, the electronic billboard 115 may aggregate data received from a number of preceding automobiles and/or a number of automobiles currently within the transmission range of the electronic billboard 115, and may transmit the aggregate vehicle data to the automobiles 105*a*, 105*b*, and 105*d* via the ad hoc wireless connections 110*a*, 110*b*, and hod, such that the automobiles 105*a*, 105*b*, and/or 105*d* may compute the average traffic speed and/or vehicle density to determine traffic conditions ahead. The electronic billboard 115 may also transmit the aggregate vehicle data to an interested party via the network 120.

Also, the electronic billboard 115 may receive device identification information from the automobiles 105*a*, 105*b*, and/or 105*d* via the ad hoc wireless connections 110*a*, 110*b*, and/or 110*d*, respectively. The electronic billboard 115 may thereby provide information indicating a presence of the automobiles 105*a*, 105*b*, and/or 105*d* within a predetermined distance of the electronic billboard 115 to the network 120 or other fixed network access point based on the received device identification information. As such, law enforcement and/or other authorized parties may be able to track the locations of the automobiles 105*a*, 105*b*, and/or 105*d* based on the geographic location of the electronic billboard 115.

In addition, one or more mobile electronic devices within the transmission range of the electronic billboard 115, such as automobiles 105*a*, 105*b*, and/or 105*d*, may be configured to relay the location-specific data received from the electronic billboard 115 to one or more other mobile electronic devices that may be beyond the transmission range of the electronic billboard 115. For example, as shown in FIG. 1, automobile 105*b* may receive location-specific data, such as emergency information, from the electronic billboard 115 via the ad hoc wireless connection 110*b*, and may establish an ad hoc wireless connection 110*c* with another automobile 105*c* that is beyond the transmission range of the electronic billboard 115. As such, the automobile 105*b* may relay the emergency information provided by the electronic billboard 115 to the automobile 105*c* via the ad hoc wireless connection 110*c*. Thus, the electronic billboard 115 may employ one or more mobile electronic devices within its transmission range, such as the automobiles 105*a*, 105*b*, and/or 105*d*, to transmit the location-specific data to devices beyond its transmission range.

Although FIG. 1 illustrates an exemplary mobile ad hoc cooperative communication system, it will be understood that embodiments of the present invention are not limited to such a configuration, but are intended to encompass any configuration capable of carrying out the operations described herein. For example, although illustrated in FIG. 1 with reference to the automobiles 105*a*-105*d*, other mobile electronic devices, such as laptop computers, notebook computers, handheld computers, personal communication systems (PCS) terminals, personal digital assistants (PDA), pagers, and/or cellular radio telephones may be configured to establish ad hoc wireless connections with the electronic billboard 115 to receive location-specific data therefrom.

Figure 2:
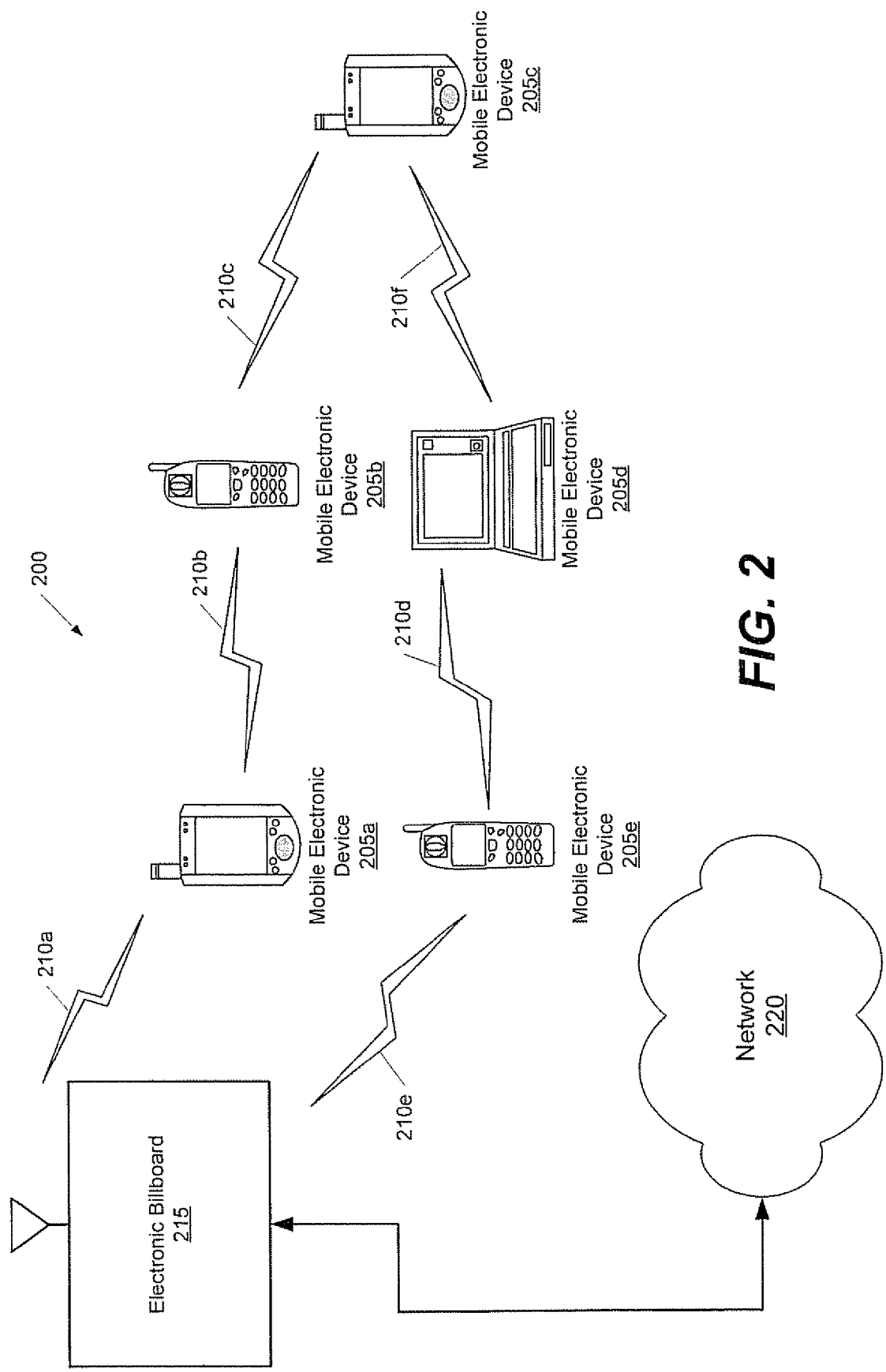
FIG. 2 is a block diagram illustrating a mobile ad hoc cooperative communication system for providing advertising and/or information services and related devices according to further embodiments of the present invention.

FIG. 2 is a block diagram illustrating a mobile ad hoc cooperative communication system 200 and related devices and methods according to further embodiments of the present invention. Referring now to FIG. 2, the mobile ad hoc cooperative communication system 200 includes a plurality of mobile electronic devices 205*a*-205*e* and an electronic billboard 215. The electronic billboard 215 may be coupled to a network 220, and as such, may receive location-specific data and/or updates thereto from local businesses, organizations, and the like via the network 120. The electronic billboard 215 and the network 220 may respectively correspond to the electronic billboard 115 and the network 120 discussed above with reference to FIG. 1. The mobile electronic devices 205*a*-205*d* may be, for example, laptop computers, notebook computers, handheld computers, personal communication systems (PCS) terminals, personal digital assistants (PDA), pagers, and/or radio telephones; however, the mobile electronic devices 205a-205d need not all be identical. For example, as shown in FIG. 2, mobile electronic devices 205a and 205c are PDAs, mobile electronic devices 205b and 205e are cellular radio telephones, and mobile electronic device 205d is a laptop computer.

The mobile electronic devices 205a-205e each include a wireless local area network interface transceiver that supports formation of one or more ad hoc wireless connections 210a-210e. For example, mobile electronic device 205a may use its wireless local area network interface transceiver to detect the electronic billboard 215 within a predetermined distance, and may establish an ad hoc wireless connection 210a with the electronic billboard 215. The wireless local area network interface transceiver, for example, may be provided according to a Wi-Fi standard and/or a Bluetooth standard. In addition, one or more of the mobile electronic devices 205a-205e may include infrared (IR) transceivers configured to establish the ad hoc wireless connections 210a-210e using infrared couplings. Also, one or more of the mobile electronic devices 205a-205c may include a public land mobile network (PLMN) transceiver configured to establish wireless connections through a fixed network access point, such as a cellular base station.

As such, one or more of the mobile electronic devices 205a-205d may be configured to receive location-specific data, such as advertising content, traffic conditions, road construction conditions, emergency information, and/or tourist information, from the electronic billboard 215 via one or more ad hoc wireless connections to the electronic billboard 215, in a manner similar to that described above with reference to the automobiles 105a-105d of FIG. 1. More particularly, as shown in FIG. 2, the electronic billboard 215 may detect mobile electronic devices 205a and 205e within the transmission range of the electronic billboard 215, and may establish ad hoc wireless connections 210a and 210e with the mobile electronic devices 205a and 205e, respectively. As such, the mobile electronic devices 205a and 205e may receive location-specific data transmitted by the electronic billboard 215 via the ad hoc wireless connections 210a and 210e, and may display the received location-specific data on the mobile electronic devices 205a and 205e for viewing by users thereof. For example, the location-specific data transmitted by the electronic billboard 215 may be advertising content, and the mobile electronic devices 205a and/or 205e may be configured to integrate the received advertising content with currently displayed content on the mobile electronic devices 205a and/or 205e, for example, as a text and/or image overlay on at least a portion of the currently displayed content.

In addition, one or more of the mobile electronic devices 205a-205d may be configured to transmit user and/or device information (including demographic and/or identifying information) to the electronic billboard 215 via respective ad hoc wireless connections, and as such, may receive location-specific data from the electronic billboard 215 based on the transmitted data provided by the mobile electronic devices. For example, the mobile electronic device 205a may transmit information regarding MP3 files currently stored in its memory to the electronic billboard 215 via the ad hoc wireless connection 210a, and the mobile electronic device 205e may transmit information regarding remaining battery life to the electronic billboard 215 via the ad hoc wireless connection 210e. Based on the received information, the electronic billboard 215 may transmit targeted advertising content for a particular type of music to the mobile electronic devices 205a over the ad hoc wireless connections 210a, and may transmit targeted advertising content for a new battery to the mobile electronic device 205d over the ad hoc wireless connection 210e. The electronic billboard 215 may also store the information received from the mobile electronic devices 205a and/or 205e in a database, and/or may provide the information to one or more interested parties via the network 220.

Furthermore, one or more of the mobile electronic devices 205a-205e may be configured to relay the location-specific data received from the electronic billboard 215 to one or more other mobile electronic devices that may be beyond the transmission range of the electronic billboard 215. For example, after receiving an emergency hurricane warning from the electronic billboard 215 via the ad hoc wireless connection 210a, the mobile electronic device 205a may detect mobile electronic devices 205b-205d that are beyond the transmission range of the electronic billboard 215. The mobile electronic device 205a may detect the mobile electronic devices 205b-205d based on respective signals provided therefrom and/or using other discovery techniques as are well known in the art. In addition, in some embodiments, the mobile electronic device 205a may be configured to determine spatial relationships for the mobile electronic devices 205b-205d relative to the mobile electronic device 205a, for example, using techniques as described in commonly assigned U.S. patent application Ser. No. 11/548,821 filed Oct. 12, 2006, the disclosure of which is incorporated by reference herein in its entirety. As such, the mobile electronic device 205a may establish an ad hoc wireless connection 210b with the mobile electronic device 205b, and may relay the emergency hurricane warning information to the mobile electronic device 205b via the ad hoc wireless connection 210b. Similarly, the mobile electronic device 205b may detect mobile electronic device 205c within a predetermined distance, establish an ad hoc wireless connection 210c with mobile electronic device 205c, and relay the emergency hurricane warning information to mobile electronic device 205c via the ad hoc wireless connection 210c. Likewise, where the emergency hurricane warning data is received at mobile electronic device 205e from the electronic billboard 215 via the ad hoc wireless connection 210e, the mobile electronic device 205e may detect mobile electronic device 205d beyond the transmission range of the electronic billboard 215, and may thus relay the emergency hurricane warning information to mobile electronic device 205d by establishing an ad hoc wireless connection 210d with mobile electronic device 205d.

In addition, one or more of the mobile electronic devices 205a-205e may be configured to transmit identification information to the electronic billboard 215 via the ad hoc wireless connections 210a-210e, and the identification information may be provided to one or more authorized parties via the network 220. As such, the general location of one or more of the mobile electronic devices 205a-205e may be determined based on the geographic location of the electronic billboard 215. For example, a parent whose child is carrying mobile electronic device 205a may access a website that indicates that mobile electronic device 205a is currently within a given distance of electronic billboard 215, such that the parent may locate the child based on the known location of the electronic billboard 215.

Although FIG. 2 illustrates an exemplary mobile ad hoc cooperative communication system configured to provide advertising and/or information services according to some embodiments of the present invention, it will be understood that some embodiments of the present invention are not limited to such a configuration, but are intended to encompass any configuration capable of carrying out the operations described herein. For example, although illustrated as laptops, PDAs, and cellular telephones, it is to be understood that the mobile electronic devices 205a-205d may be integrated and/or otherwise associated with other mobile electronic devices, including automobiles and/or other vehicles, such as the automobiles 105a-105d illustrated in FIG. 1.

Figure 3:
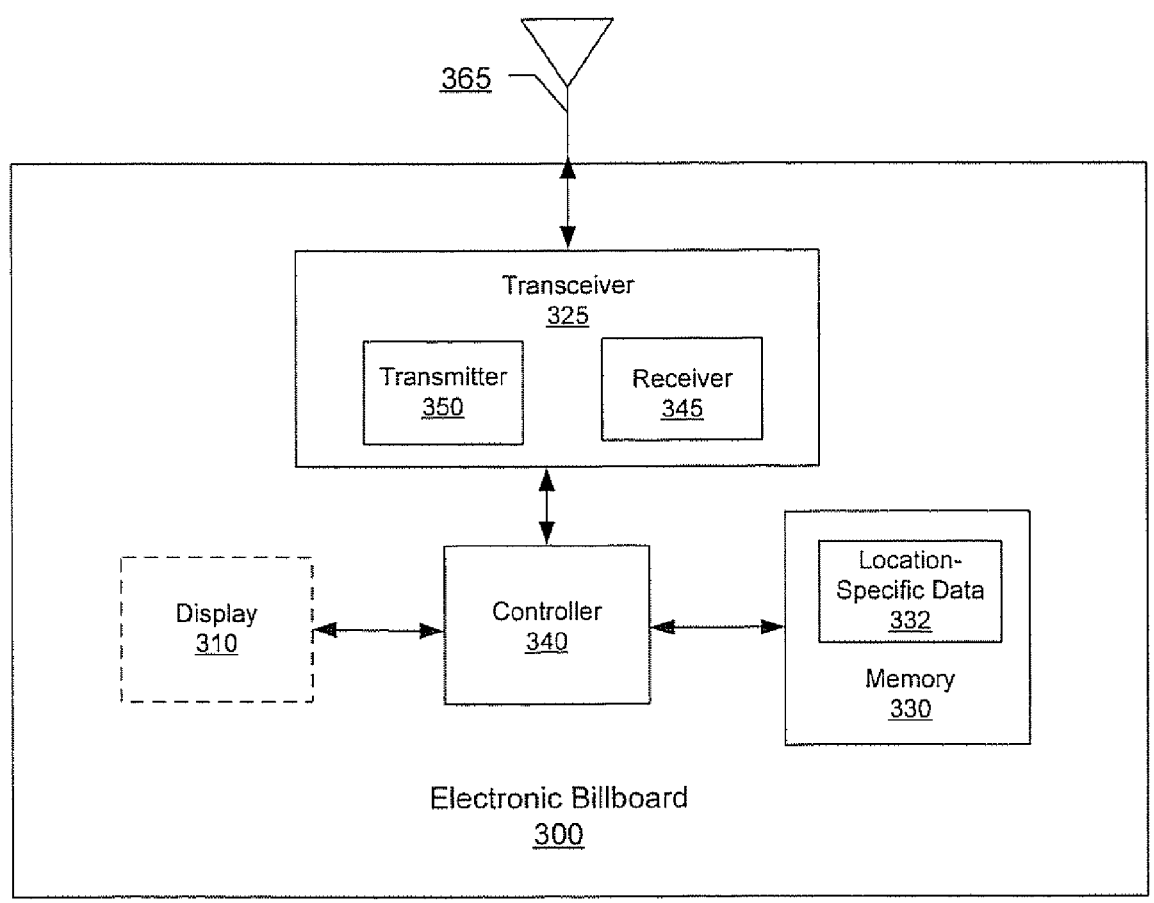
FIG. 3 is a block diagram illustrating an electronic billboard configured to provide advertising and/or information services according to some embodiments of the present invention.

FIG. 3 is a block diagram illustrating embodiments of an electronic billboard 300 according to some embodiments of the present invention. The electronic billboard 300 may be any fixed and/or mobile device that is configured to wirelessly transmit advertising and/or other information content, and as such, may be incorporated into signs, traffic lights, conventional billboards, and/or other fixtures. In some embodiments, the electronic billboard 300 may correspond to the electronic billboard 115 of FIG. 1. As shown in FIG. 3, the electronic billboard 300 includes a wireless transceiver 325 coupled to an antenna 365, a controller 340, and a memory 330. The transceiver 325 includes a wireless local area network interface transceiver including a transmitter 350 and a receiver 345 configured to establish an ad hoc wireless connection, such as Bluetooth, Wi-Fi, and/or IR connection, with at least one other mobile electronic device within the range of the transceiver 325. In some embodiments, the antenna 365 may be a directional antenna array configured to be used to determine a traveling vector (including speed, distance, direction of movement, and/or relative positional data) for a mobile electronic device based on a received signal therefrom. While only a single antenna 365 is illustrated in FIG. 3 by way of example, multiple antennas may be provided. In addition, in some embodiments, the electronic billboard 300 may include a display 310 configured to display text, video, and/or other content associated with the geographic location of the electronic billboard 300.

Still referring to FIG. 3, the controller 340 is coupled to the transceiver 325, the memory 330, and the display 310. The controller 340 may be, for example, a commercially available or custom microprocessor that is configured to coordinate and manage operations of the transceiver 325, the memory 330, and/or the display 310. As such, the controller 340 may be configured to detect at least one mobile electronic device within a predetermined range of the electronic billboard 300, for example, based on a signal received from the mobile electronic device via the transceiver 325. The controller 340 may be further configured to establish an ad hoc wireless connection with the detected mobile electronic device using the transceiver 325, and may thereby transmit location-specific data 332 stored in the memory 330 to the detected mobile electronic device over the ad hoc wireless connection.

The location-specific data 332 may be associated with the geographic location of the electronic billboard 300. More particularly, as discussed above with reference to FIG. 1, the location-specific data 332 may include advertising content for local businesses, traffic conditions, road construction conditions, local-area information updates for a mobile device database, emergency information, and/or tourism information associated with the location of the electronic billboard 300. In addition, the controller 340 may be configured to dynamically alter and/or update the location-specific data 332 to be transmitted via the transceiver 325 based on real-time conditions. For example, when the location-specific data 332 is advertising content, the controller 340 may be configured to receive real-time supply and demand conditions at a local business establishment associated with the advertising content via the transceiver 325 and/or other network connection to the business establishment. As such, the controller 340 may dynamically alter pricing information including in the advertising content based on the real-time supply and demand conditions. More particularly, the controller 340 may be configured to alter the location-specific data 332 to provide reduced-rate pricing when demand is low and increased-rate pricing when demand is high based on the supply and demand conditions received from the local business establishment. In addition, when the location-specific data 332 includes an offer for locally available goods and/or services, the controller 340 may be configured to receive an acceptance and/or counteroffer from one or more mobile electronic devices based on the transmitted offer via the ad hoc wireless connection(s) established using the transceiver 325.

In addition, the controller 340 may be configured to transmit particular location-specific data 332 to a detected mobile electronic device over an ad hoc wireless connection established via the transceiver 325 responsive to receiving specific information, such as user and/or device information, from the mobile electronic device over the ad hoc wireless connection. More particularly, the controller 340 may be configured to transmit targeted advertising content to the mobile electronic device over the ad hoc wireless connection based on the received user and/or device information. For example, the controller 340 may receive device operating information from an automobile over an ad hoc wireless connection established via the transceiver 325 indicating that the automobile has a flat tire. As such, the controller 340 may transmit the location-specific content 332 including advertising content for local tire stores and/or service stations retrieved from the memory 330 and/or other accessible database to the automobile via the transceiver 325. Also, the controller 340 may receive personal information from a cellular telephone via an ad hoc wireless connection established via the transceiver 325 indicating the likes and/or interests of the user, such as frequently dialed phone numbers, pictorial information from the camera function of the cellular telephone, music preference information based on music files stored in the cellular phone, and/or other information which may be useful in providing targeted advertising to the owner of the cellular telephone. As such, based on the likes and/or interests indicated by the received personal information, the controller 340 may select and transmit location-specific data 332 including particular advertising content to the cellular telephone via the ad hoc wireless connection. In some embodiments, the controller 340 may be configured to transmit the location-specific data 332 responsive to receiving opt-in data from a detected mobile electronic device indicating that a user of the mobile electronic device wishes to receive the location-specific data.

The controller 340 may be further configured to receive vehicular information from one or more vehicles within the range of the transceiver 325 to determine real-time traffic data for the geographic location of the electronic billboard 300. For example, the electronic billboard may receive current speed data from one or more vehicles within the range of the transceiver 325, and may compute an average speed for the vehicles based on the received data. As such, the controller 340 may transmit the average vehicle speed to the vehicles within the range of the transceiver 325 to indicate whether traffic is moving and/or is stopped.

The controller 340 may also be configured to accumulate information received from mobile electronic devices that pass within the transmission range of the transceiver 325, and may be configured to store the received information in a local and/or remote database. Such information may be used, for example, for market research purposes. More particularly, demographic information accumulated by the electronic billboard 115 may be used to determine characteristics of potential customers that travel within the range of the transceiver 325 of the electronic billboard 300, and to thereby determine types of businesses that may be successful in or near the geographic location of the electronic billboard 300. In addition, device identification information received from mobile electronic devices within the range of the transceiver 325 may be used to indicate a presence of a mobile electronic device near the geographic location of the electronic billboard 300, for example, for use in tracking and/or otherwise locating individuals associated with the mobile electronic device by law enforcement and/or other authorized parties.

Although FIG. 3 illustrates an exemplary electronic billboard for use in a mobile ad hoc cooperative network to provide advertising and/or information services according to some embodiments of the present invention, it will be understood that some embodiments of the present invention are not limited to such a configuration, but are intended to encompass any configuration capable of carrying out the operations described herein. For example, although the memory 330 is illustrated as a separate component from the controller 340, the memory 330 or portions thereof may be considered as part of the controller 340. In addition, although the location-specific data 332 is stored in the memory 330 by way of illustration, it is to be understood that the location-specific data 332 may be stored in another network device that may be accessed by the electronic billboard 300, for example, via a wired and/or wireless connection thereto. More generally, while particular functionalities are shown in particular blocks by way of illustration, functionalities of different blocks and/or portions thereof may be combined, divided, and/or eliminated.

Figure 4A:
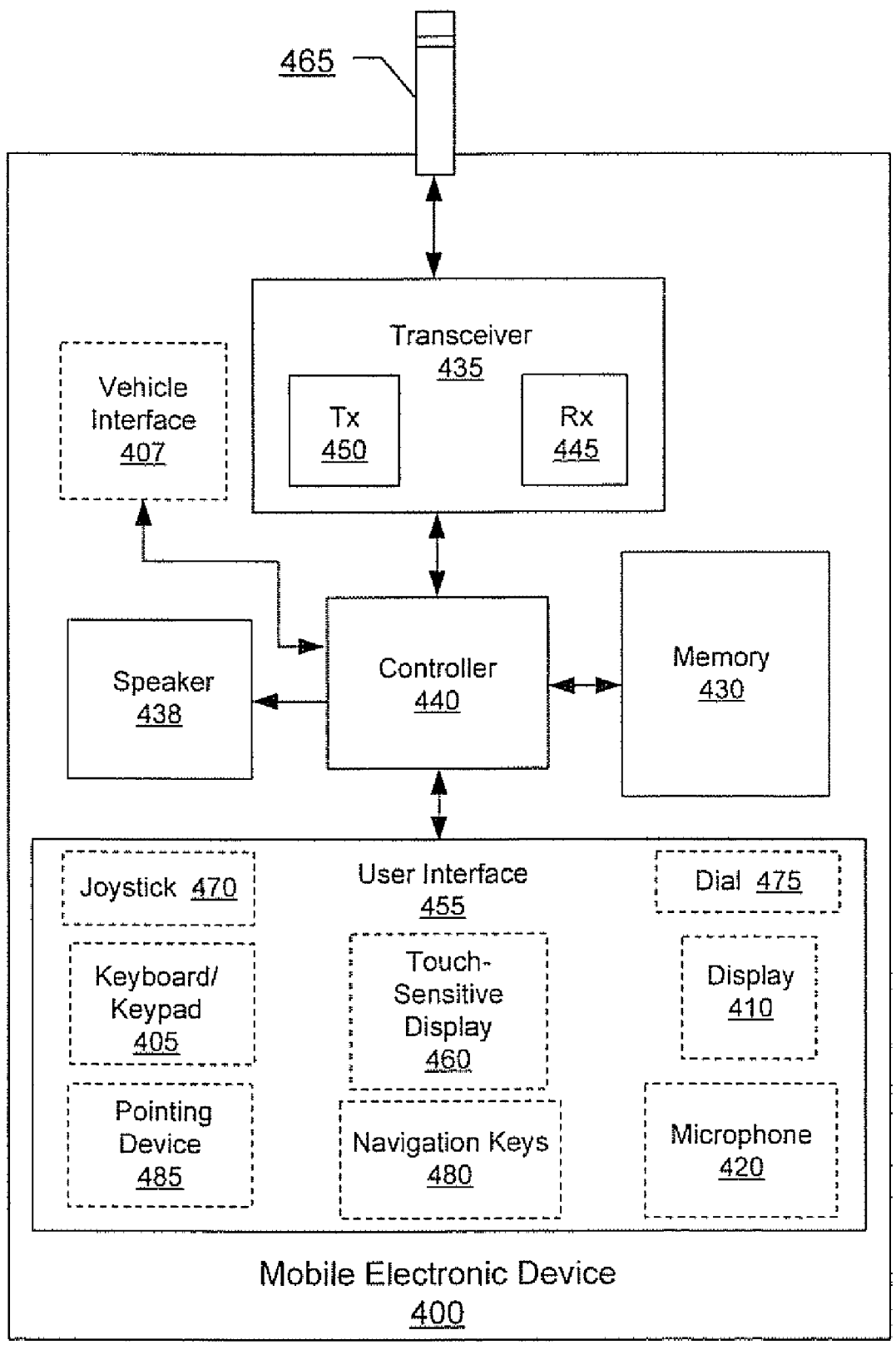
FIGS. 4A-4C are block diagrams illustrating mobile electronic devices configured to provide advertising and/or information services according to some embodiments of the present invention.
Figure 4C:
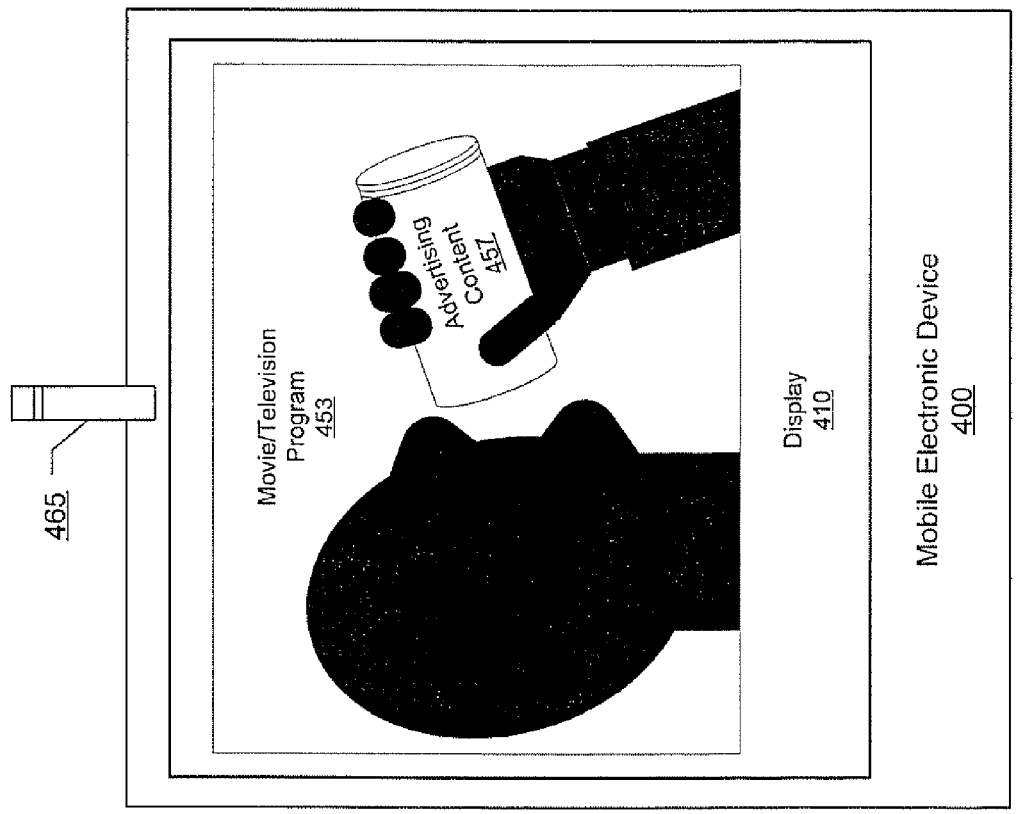
Figure 4B:
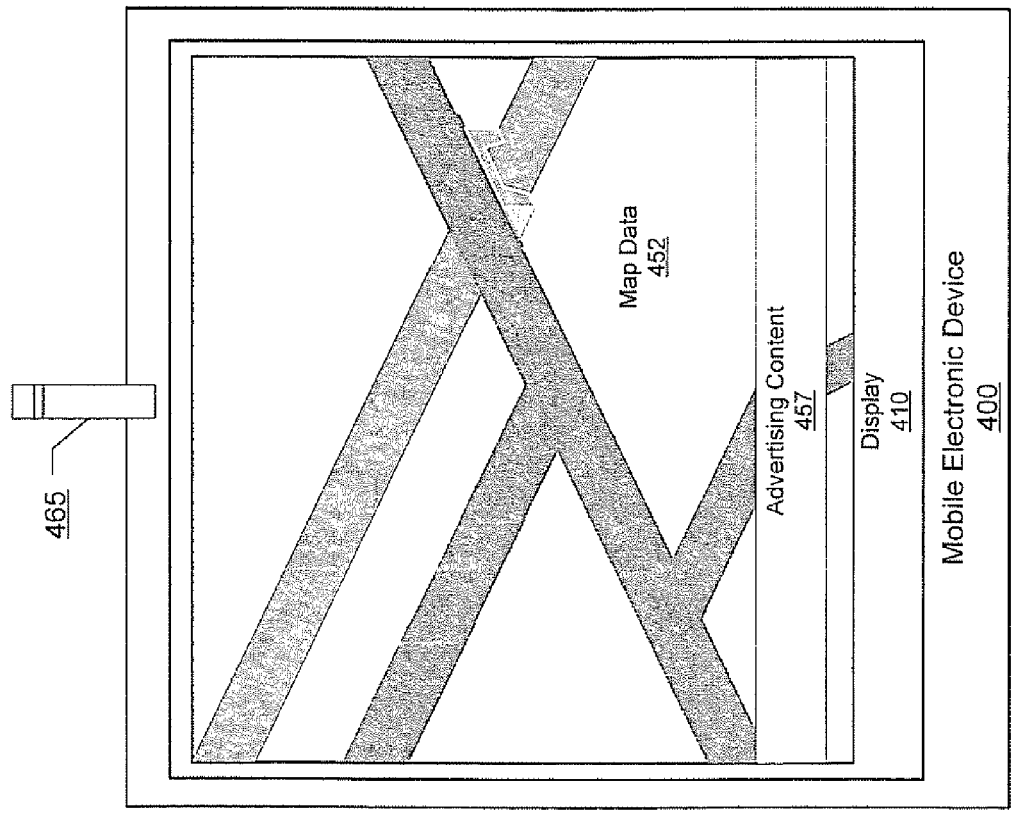

FIGS. 4A-4C are block diagrams illustrating embodiments of a mobile electronic device 400 according to some embodiments of the present invention. In some embodiments, the mobile electronic device 400 may correspond to one of the automobiles 105a-105d of FIG. 1 and/or one of the mobile electronic devices 205a-205d of FIG. 2. As shown in FIG. 4A, the mobile electronic device 400 includes a wireless transceiver 435 coupled to an antenna 465, a controller 440, a memory 430, a speaker 438, and a user interface 455. Depending on the functionalities offered by the mobile electronic device 400, the user interface 455 may include a microphone 430, a display 410, a joystick 470, a keyboard/keypad 405, a touch sensitive display 460, a dial 475, navigation keys 480, and/or a pointing device 485 (such as a mouse, trackball, touchpad, etc.). However, additional and/or fewer elements of the user interface 455 may actually be provided. For example, in an automobile user interface, the touch sensitive display 460 may be provided in place of a keypad 405, a pointing device 485.

The controller 440 is coupled to the transceiver 435, the memory 430, the speaker 438, and the user interface 455. The controller 440 may be, for example, a commercially available or custom microprocessor that is configured to coordinate and manage operations of the transceiver 435, the memory 430, the speaker 438, and the user interface 455. As such, the controller 440 may be configured to detect an electronic billboard within a predetermined distance of the mobile electronic device 400, for example, based on a signal from the electronic billboard received via the transceiver 435.

The transceiver 435 includes a transmitter 450 and a receiver 445. The transceiver 435 also includes a wireless local area network interface transceiver configured to establish an ad hoc wireless connection, such as a Bluetooth, Wi-Fi-, and/or IR connection, with the detected electronic billboard. In addition, the transceiver 435 may include a PLMN transceiver configured to establish a wireless connection with a PLMN, for example, via a fixed network access point, such as a cellular base station. While a single antenna 465 is illustrated in FIG. 4A by way of example, separate antennas may be provided for the wireless local area network interface transceiver and/or the PLMN transceiver. Alternatively, multiple antennas may be shared by the PLMN transceiver and the wireless local area network interface transceiver, and/or multiple antennas may be provided for one or both of the wireless local area network interface transceiver and the PLMN transceiver.

As such, the mobile electronic device 400 may be configured to receive location-specific data from the electronic billboard over the ad hoc wireless connection provided by the transceiver 435. The location-specific data may include information associated with the geographic location of the electronic billboard, such as advertising content for local businesses, current traffic conditions, road construction conditions, emergency information, and/or tourism information associated with the geographic location of the electronic billboard. The mobile electronic device 400 may be configured to display the location-specific data received from the electronic billboard via the user interface 455. For example, the mobile electronic device 400 may display the received location specific data on the display 410. In addition, in some embodiments, the mobile electronic device 400 may be integrated and/or associated with a vehicle, such as one of the automobiles 105a-105d of FIG. 1. As such, the mobile electronic device 400 may display the received location-specific data on a dashboard-mounted monitor, in the vehicle instrument panel, and/or in the vehicle radio display (for example, as a text message).

The controller 440 of the mobile electronic device 400 may be further configured to integrate the received location-specific data with data that is currently displayed by the mobile electronic device 400. FIGS. 4B and 4C are block diagrams illustrating particular examples of integration of received location-specific data in mobile electronic devices according to some embodiments of the present invention.

Referring now to FIG. 4B, the location-specific data received from the electronic billboard may be advertising content that is associated with a specific video layer, such as one of the video layers provided by the MPEG-4 video standard. As such, the location-specific data may be integrated with the currently-displayed content by providing the location-specific data as a text and/or image overlay on at least a portion of the currently-displayed content. More particularly, as shown in FIG. 4B, the mobile electronic device 400 may be navigation system configured to provide map data 452 for the area in which a vehicle is currently traveling on the display 410. As such, responsive to receiving advertising content from an electronic billboard over an ad hoc wireless connection via the antenna 465, the mobile electronic device 400 may integrate the received advertising content by providing the advertising content 457 as a text and/or image overlay on at least a portion of the map data 452. The advertising content 457 may thereby be provided to a viewer of the display 410 and/or a user of the mobile electronic device 400 without interruption of the use of the map data 452. The mobile electronic device 400 may be further configured to receive a user selection indicating a desire to travel to a location associated with the displayed advertising content 457 via the user interface 455. The controller 440 may thereby compute distance and/or directions to the location associated with the displayed advertising content 457 responsive to the user selection, and may display the computed directions on the display 410 as the map data 452.

In addition, referring to FIG. 4C, the mobile electronic device 400 may be configured to replace default advertising data associated with the currently displayed content with the location-specific advertising data received from the electronic billboard. For example, the default advertising data may be tagged with metadata that identifies the default advertising data as replaceable. As such, the mobile electronic device 400 may be configured to identify the default advertising data based on the metadata and insert the location-specific advertising data into the currently displayed content to replace the default advertising data. More particularly, as shown in FIG. 4C, a character in a movie/television program 453 that is currently shown on the display 410 of the mobile electronic device 400 may be drinking a particular beverage. The movie/television program 453 may be configured to display default advertising content on the label of the beverage container, and the default advertising content may be encoded with metadata indicating the specific video layer of the default advertising content and/or other characteristics that may allow the default advertising content to be identified by the mobile electronic device 400. Accordingly, responsive to receiving location-specific advertising data from an electronic billboard over an ad hoc wireless connection, the mobile electronic device 400 may replace the default advertising content on the beverage container in the movie/television program 453 with location-specific advertising data 457, to thereby provide advertising for a beverage associated with the geographic location of the electronic billboard on the display 410. In addition, where the currently displayed movie/television program 453 includes scheduled commercial content (for example, where the movie/television program 453 is received via satellite TV broadcast), the mobile electronic device 400 may be configured to replace the scheduled commercial content with location-specific commercial content received from the electronic billboard over the ad hoc wireless connection to advertise local businesses.

Referring again to FIG. 4A, the mobile electronic device 400 may also be configured to transmit particular information to the electronic billboard via the ad hoc wireless connection established by the transceiver 435, which may influence the location-specific data that is received from the electronic billboard. For example, the mobile electronic device 400 may transmit user information and/or device information to the electronic billboard over the ad hoc wireless connection via the transceiver 435. In response to this transmission, the mobile electronic device 400 may receive targeted advertising data from the electronic billboard that is based on the user and/or device information provided by the mobile electronic device 400. For example, where the mobile electronic device 400 is a cellular phone, the controller 440 may retrieve information from the memory 430 about the user of the mobile electronic device 400, such as frequently called numbers, stored music files, and/or other data that may indicate the user's interests and/or preferences, and may transmit this information to the electronic billboard via the ad hoc wireless connection. In addition, the controller 440 may be configured to transmit information about the mobile electronic device 400 itself, such as remaining battery life, to the electronic billboard via the ad hoc wireless connection established by the transceiver 435.

In addition, in some embodiments where the mobile electronic device 400 is a automobile, the mobile electronic device 400 may include a vehicle interface 407 configured to receive and transmit information between the mobile electronic device 400 and the various other systems of the automobile. As such, the controller 440 may retrieve vehicle operating information that may be of interest to a local business, such as remaining fuel, oil, tire pressure, and/or other vehicle operating information, and may transmit this information to the electronic billboard to thereby receive targeted advertising based on the transmitted vehicle operating information. Also, the controller 440 may be configured to determine information about the driver of the automobile via the vehicle interface 407, and may provide this information to the electronic billboard via the ad hoc wireless connection. For example, the automobile may include an in-car camera focused on the eyes of the driver, and as such, the controller 440 may determine driver alertness and/or drowsiness information for transmission to the electronic billboard. In addition, the controller 440 may identify information about the current driver based on certain vehicle settings and/or information stored in the driver's key. For example, the controller 440 may determine the driver's approximate height based on the seat position and/or mirror settings stored in the key. Also, the controller 440 may determine the driver's approximate weight based on a weight sensor in the seat. Accordingly, the mobile electronic device 400 may be configured to transmit user and/or device information to the electronic billboard and may thereby receive targeted advertising content based on the transmitted information over the ad hoc wireless connection.

The user and/or device operating information transmitted to the electronic billboard from the mobile electronic device 400 may be anonymous in terms of the actual identity of the user and/or the mobile electronic device 400, such as demographic information. However, in some embodiments, the mobile electronic device 400 may be configured to provide non-anonymous information including the actual identity of the user and/or the mobile electronic device 400 to the electronic billboard, for example, in response to an offer for locally available goods and/or services. For instance, the mobile electronic device 400 may receive an advertisement for room availability at a hotel near the geographic location of the electronic billboard, which may be displayed by the mobile electronic device 400 on the display 410. As such, a user of the mobile electronic device 400 may accept the displayed offer via the user interface 455, and the mobile electronic device 400 may transmit the acceptance of the offer over the ad hoc wireless connection to the electronic billboard. In addition, the mobile electronic device 400 may prompt the user to input non-anonymous identifying information, such as the user's name, as well as payment information, such as the user's credit card number, via the user interface 455, and the mobile electronic device 400 may transmit the non-anonymous personal and/or payment information to the electronic billboard via the ad hoc wireless connection to be relayed to the local hotel. The mobile electronic device 400 may be configured to allow a user to set the type and/or level of detail of the user and/or device information transmitted to the electronic billboard. In addition, in some embodiments, the mobile electronic device 400 may be configured to receive the location-specific data from the electronic billboard responsive to providing opt-in data to the electronic billboard.

Still referring to FIG. 4A, in some embodiments where the mobile electronic device 400 is an automobile, the mobile electronic device 400 may be configured to transmit vehicle information such as vehicle speed, braking, and/or collision data retrieved via the vehicle interface 407 to the electronic billboard over the ad hoc wireless connection. As such, the mobile electronic device 400 may receive traffic data from the electronic billboard based on the vehicle information provided by the mobile electronic device 400 and/or other mobile electronic devices within the transmission range of the electronic billboard. For example, the received traffic data may include aggregate speed data for a plurality of vehicles within the range of the electronic billboard, which may be averaged and/or otherwise processed by the controller 440 and displayed via the display 410 of the mobile electronic device 400 to indicate slowing and/or stopped traffic conditions ahead. In addition, the mobile electronic device 400 may be configured to establish ad hoc wireless connections with other mobile electronic devices, and as such, may relay the location-specific data received from the electronic billboard to the other mobile electronic devices over the respective ad hoc wireless connections. Thus, the mobile electronic device 400 may be used to extend a transmission range of the electronic billboard to one or more mobile devices that may be beyond the transmission range of the electronic billboard.

In addition, the mobile electronic device 400 may be configured to update a database stored in the mobile electronic device 400 with the received location-specific data from the electronic billboard. For instance, where the mobile electronic device 400 includes a navigation system, the mobile electronic device 400 may receive information updates from an electronic billboard regarding local road construction and/or local businesses that may not be currently included in the navigation system. As such, the controller 440 may compare the received information updates with the data stored in the navigation system database, and may thereby update the navigation system database with the received data from the electronic billboard.

Although FIGS. 4A-4C illustrate exemplary mobile electronic devices that may be used in mobile ad hoc cooperative networks to provide advertising and/or information services according to some embodiments of the present invention, it will be understood that some embodiments of the present invention are not limited to such a configuration, but are intended to encompass any configuration capable of carrying out the operations described herein. For example, although the memory 430 is illustrated as a separate component from the controller 440, the memory 430 or portions thereof may be considered as part of the controller 440. More generally, while particularly functionalities are shown in particular blocks by way of illustration, functionalities of different blocks and/or portions thereof may be combined, divided, and/or eliminated. In addition, it is to be understood that the mobile electronic device 400 may be integrated and/or otherwise associated with other mobile electronic devices, such as automobiles and/or other vehicles.

Figure 5:
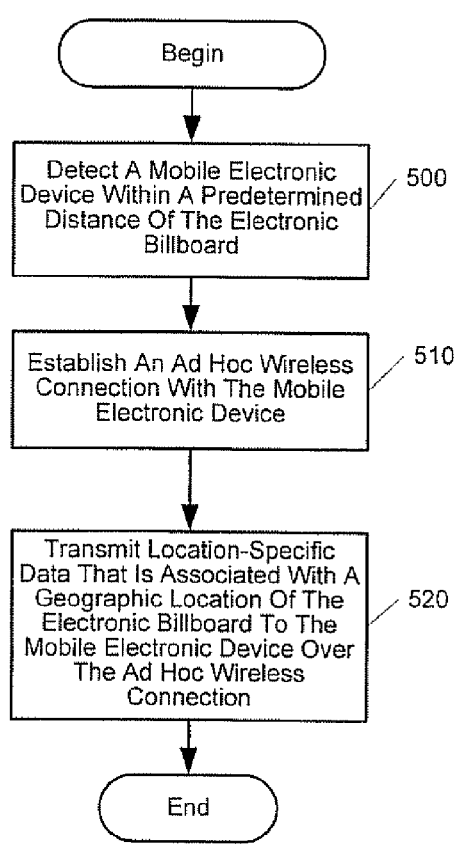
FIG. 5 is a flowchart illustrating exemplary operations which may be performed by an electronic billboard to provide advertising and/or information services according to some embodiments of the present invention.

FIG. 5 is a flowchart illustrating exemplary operations that may be performed by an electronic billboard, such as the electronic billboard 300 of FIG. 3, to provide advertising and/or information services in a mobile ad hoc cooperative network according to some embodiments of the present invention. Referring now to FIG. 5, operations begin at Block 500 when a mobile electronic device is detected within a predetermined distance of the electronic billboard. For example, the mobile electronic device may be detected based on a signal received from the mobile electronic device. In addition, in some embodiments, a traveling vector for the mobile electronic device may be determined based on changes in the received signal strength, changes in perceived frequency and/or wavelength of the received signal, and/or using a directional antenna array. The traveling vector may indicate the speed, distance, and/or direction of movement of the detected mobile electronic device. As such, it may be determined whether the mobile electronic device is approaching the electronic billboard and/or is traveling away from the electronic billboard.

At Block 510, an ad hoc wireless connection is established with the detected mobile electronic device. For example, the ad hoc wireless connection may be a Bluetooth, Wi-Fi, and/or infrared connection. At Block 520, location-specific data that is associated with a geographic location of the electronic billboard is transmitted to the mobile electronic device over the ad hoc wireless connection. For example, the location-specific data may include advertising content for local businesses, road construction conditions within a vicinity of the electronic billboard, local area information updates for a mobile electronic device database, emergency information such as severe weather updates, and/or tourism information associated with the location of the electronic billboard. In addition, other location-specific data, such as targeted advertising and/or current traffic conditions, may be transmitted to the mobile electronic device over the ad hoc wireless connection responsive to receiving specific data from the mobile electronic device regarding an associated user and/or vehicle. As such, an electronic billboard may provide advertising and/or other local information content to a mobile electronic device within transmission range of the electronic billboard over an ad hoc wireless connection to the mobile electronic device.

Figure 6:
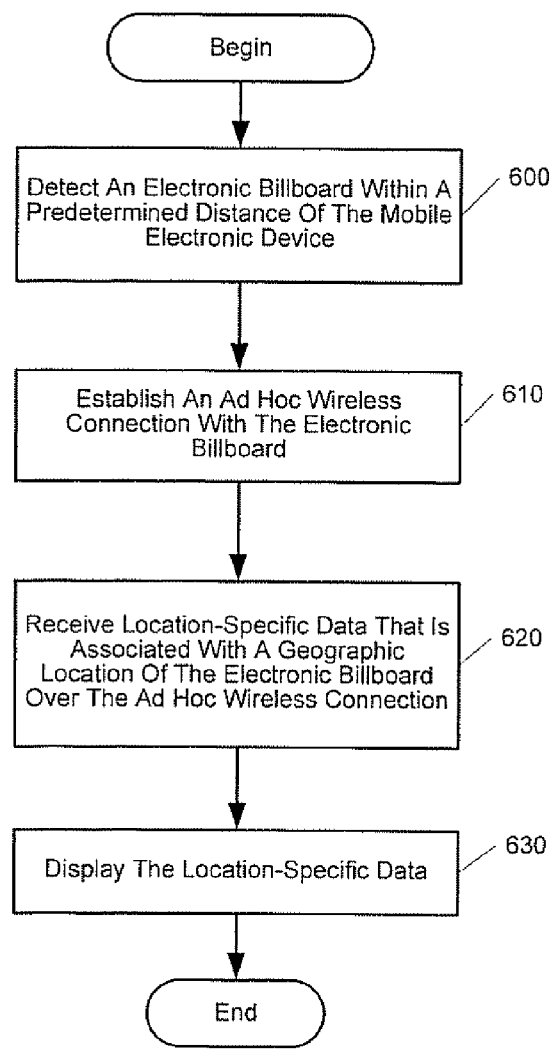
FIG. 6 is a flowchart illustrating exemplary operations which may be performed by a mobile electronic device to provide advertising and/or information services according to some embodiments of the present invention.

FIG. 6 is a flowchart illustrating exemplary operations that may be performed by a mobile electronic device, such as the mobile electronic device 400 of FIG. 4A, to provide advertising and/or information services in a mobile ad hoc cooperative network according to some embodiments of the present invention. Referring now to FIG. 6, operations begin at Block 600 when an electronic billboard is detected within a predetermined distance of a mobile electronic device. For example, the electronic billboard may be detected using a signal broadcast by the electronic billboard. Other discovery techniques may also be used to detect the electronic billboard, as are well known in the art.

At Block 610, an ad hoc wireless connection, such as a Bluetooth, Wi-Fi, and/or IR connection, is established with the detected electronic billboard. As such, location-specific data that is associated with a geographic location of the electronic billboard is received from the electronic billboard over the ad hoc wireless connection at Block 620. For example, the location-specific data may include advertising content for local businesses, road construction conditions within a vicinity of the electronic billboard, local area information updates for a database stored in the mobile electronic device (such as an in-car DVD navigation system), emergency information, and/or tourism information associated with the location of the electronic billboard. In addition, the received location-specific data may be influenced by information transmitted from the mobile electronic device to the electronic billboard over the ad hoc wireless connection. For example, information regarding a user and/or vehicle associated with the mobile electronic device may be transmitted to the electronic billboard over the ad hoc wireless connection established at Block 610, and as such, particular location-specific data, such as targeted advertising and/or current traffic conditions, may be received from the electronic billboard over the ad hoc wireless connection at Block 620 based on the transmitted information.

The received location-specific data is displayed at the mobile electronic device at Block 630. For example, the received location-specific data may be displayed on a monitor associated with the mobile electronic device. For example, where the mobile electronic device is an automobile, the received location-specific data may be displayed on a dashboard mounted monitor, in a vehicle instrument panel, and/or as a text message in a vehicle radio display. Also, the received location-specific data may be integrated with content that is currently displayed on the mobile electronic device. For example, the location-specific data may be provided as a text and/or image overlay on at least a portion of the currently displayed content. In addition, default advertising data in the currently displayed content may be replaced with location-specific advertising data, for example, based on metadata tags associated with the default advertising content. Moreover, a database stored in the mobile electronic device, such as a navigation system, may be updated based on the received location-specific data. As such, a mobile electronic device may receive advertising and/or information services from an electronic billboard within a predetermined distance of the mobile electronic device over an ad hoc wireless connection to the electronic billboard.

The flowcharts of FIGS. 5 and 6 illustrate the architecture, functionality, and operations of some embodiments of mobile ad hoc cooperative networks and related devices according to some embodiments of the present invention. In this regard, each Block may represent a module, segment, or a portion of code, which may comprise one or more executable instruction for implementing the specified logical functions. It should also be noted that in other implementations, the functions noted in the Blocks may occur out of the order noted in FIGS. 5 and 6. For example, two Blocks shown in succession may, in fact, be executed substantially concurrently, or the Blocks may be sometimes executed in the reverse order, depending on the functionality involved.

In the drawings and specification, there have been disclosed exemplary embodiments of the invention, and although specific terms are used, they are used in a generic and descriptive sense only and not for purposes of limitation, the scope of the invention being defined by the following claims.

That which is claimed:

1. A method of operating an electronic billboard, the method comprising:
   detecting a mobile electronic device within a predetermined distance of the electronic billboard;
   establishing an ad hoc wireless connection with the mobile electronic device;
   receiving information about a user of the mobile electronic device and/or about current operating parameters of the mobile electronic device from the mobile electronic device over the ad hoc wireless connection;
   transmitting location-specific data that is associated with a geographic location of the electronic billboard to the mobile electronic device over the ad hoc wireless connection responsive to receiving the information from the mobile electronic device, wherein the location-specific data comprises content that is based on the information received from the mobile electronic device, and wherein transmitting the location-specific data comprises transmitting targeted advertising content to the mobile electronic device over the ad hoc wireless connection responsive to receiving the information; and
   updating displayed location-specific data on the electronic billboard responsive to receiving the information from the mobile electronic device.

2. The method of claim 1, wherein detecting the mobile electronic device further comprises:
   receiving a signal from the mobile electronic device; and
   determining a traveling vector for the mobile electronic device based on the signal,
   wherein establishing the ad hoc wireless connection comprises establishing the ad hoc wireless connection in response to the traveling vector indicating that the mobile electronic device is traveling in a direction toward a geographic location of a content provider for the electronic billboard,
   and wherein transmitting the location-specific data comprises transmitting location-specific data associated with the content provider.

3. The method of claim 1, wherein the location-specific data comprises advertising content, and further comprising:
   dynamically altering pricing information included in the advertising content based on real-time supply and demand conditions at a business establishment associated with the advertising content.

4. The method of claim 1, wherein receiving information about the user of the mobile electronic device and/or about the current operating parameters from the mobile electronic device comprises receiving vehicular information from a plurality of mobile electronic devices within the predetermined distance of the electronic billboard over respective ad hoc wireless connections thereto, and further comprising:
   generating traffic data based on the received vehicular information,
   wherein transmitting the location-specific data comprises transmitting the traffic data to the mobile electronic device.

5. The method of claim 1, further comprising:
   receiving user and/or device information from a plurality of mobile electronic devices that pass within the predetermined distance of the electronic billboard over a respective plurality of ad hoc wireless connections thereto; and
   storing the received user and/or device information in a database.

6. The method of claim 1, further comprising:
   receiving device identification information from the mobile electronic device over the ad hoc wireless connection; and
   providing information indicating a presence of the mobile electronic device within the predetermined distance of the electronic billboard to a fixed network access point responsive to receiving the device identification information.

7. An electronic billboard configured to carry out the method of claim 1.

8. A computer readable medium for operating an electronic billboard, the computer readable medium comprising:
   a computer readable storage medium including computer readable program code therein that, when executed, performs the method of claim 1.

9. A method of operating a mobile electronic device, the method comprising:
   detecting an electronic billboard within a predetermined distance of the mobile electronic device;
   establishing an ad hoc wireless connection with the electronic billboard;
   transmitting information about a user of the mobile electronic device and/or about current operating parameters of the mobile electronic device to the electronic billboard over the ad hoc wireless connection;
   receiving location-specific data that is associated with a geographic location of the electronic billboard from the electronic billboard over the ad hoc wireless connection responsive to transmitting the information to the electronic billboard, wherein the location-specific data comprises content that is based on the information transmitted to the electronic billboard; and
   displaying the location-specific data by integrating the location-specific data with currently-displayed content, wherein the location-specific data comprises location-specific advertising data, wherein the currently-displayed content comprises video content including other advertising data integrated therein that is tagged with metadata indicating that the other advertising data is replaceable, and wherein integrating the location-specific data comprises:
   identifying the other advertising data in the currently-displayed video content as being replaceable based on the metadata responsive to receiving the location-specific advertising data; and replacing the other advertising data in the currently-displayed video content with the location-specific advertising data responsive to identifying the other advertising data such that the location-specific advertising data is integrated in the currently-displayed video content.

10. The method of claim 9, wherein the location-specific data is associated with a specific video layer, and wherein integrating the location-specific data comprises:

providing the location-specific data as a text and/or image overlay on at least a portion of the currently-displayed content.

11. The method of claim 9, wherein receiving the location-specific data comprises receiving an offer for locally available goods and/or services, and further comprising:

transmitting an acceptance and/or counteroffer to the electronic billboard over the ad hoc wireless connection responsive to receiving the offer.

12. The method of claim 9, further comprising:

transmitting user and/or device information to the electronic billboard over the ad hoc wireless connection; wherein receiving the location-specific data comprises receiving targeted advertising from the electronic billboard responsive to transmitting the user and/or device information.

13. The method of claim 9, further comprising:
updating a database stored in the mobile electronic device with the location-specific data responsive to receiving the location-specific data.

14. The method of claim 9, further comprising:
establishing a second ad hoc wireless connection with at least one other mobile electronic device within a predetermined distance of the mobile electronic device; and relaying the received location-specific data to the at least one other mobile electronic device over the second ad hoc wireless connection.

15. A mobile electronic device configured to carry out the method of claim 9.

16. A computer readable medium for operating a mobile electronic device, the readable medium program product comprising:

a computer readable storage medium including computer readable program code therein that, when executed, performs the method of claim 9.

* * * * *